United States Patent Office 2,945,882
Patented July 19, 1960

2,945,882
METHOD OF PREPARING N,N',N''-TRIPHENYL-BORAZOLE

Stanley F. Stafiej, Stamford, Conn., and Stephen J. Groszos, Cincinnati, Ohio, assignors to American Cyanamid Company, New York, N.Y., a corporation of Maine No Drawing. Filed Apr. 7, 1958, Ser. No. 726,634

4 Claims. (Cl. 260—551)

This invention relates broadly to a new method of making N,N',N''-triphenylborazole, the formula for which is

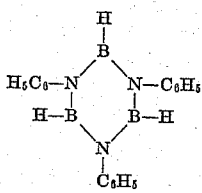

N,N',N''-triphenylborazole, which may be designated for brevity as N-triphenylborazole, is useful, for instance, as a chemical intermediate in making symmetrical and unsymmetrical substituted borazoles, as is more fully disclosed and claimed in the copending applications of Stanley F. Stafiej and Janet Hall Smalley, Serial No. 726,641, and of Janet Hall Smalley and Stanley F. Stafiej, Serial No. 726,622, filed concurrently herewith.

The present invention is based on our discovery that N,N',N''-triphenylborazole can be readily and economically prepared in good yields by effecting reaction between lithium aluminum hydride and a B,B',B''-trihalogeno-N,N',N''-triphenylborazole, specifically B,B',B''-trichloro-N,N',N''-triphenylborazole. The reaction proceeds in accordance with the following equation wherein X represents halogen. The equation also shows the stoichiometrical proportions of reactants.

II   $3LiAlH_4 + 4B_3N_3Cl_3(C_6H_5)_3$
     $\rightarrow B_3N_3H_3(C_6H_5)_3 + 3LiCl + 3AlCl_3$ As a class, borazoles are broadly old, and a review of borazoles by E. Wiberg appears in Naturwissenschaften, 35, 182, 212 (1948). The reduction of B-trichloroborazole to borazole by the action of lithium aluminum hydride has been described by Schaeffer et al. [J.A.C.S., 76, 3303 (1954)], but the borazole could not be satisfactorily recovered from the reaction mass; hence, to overcome this difficulty, the authors employed lithium borohydride as the reducing agent. Earlier investigators, Laubengayer et al. [Abstracts of Papers Presented at the September Meeting of the American Chemical Society, p. 10, P (1949)], also had found that B-trichloroborazole reacts with lithium aluminum hydride in di-n-butyl ether, but they too were unable to isolate borazole from the reaction mass. Schaefer et al. reasoned that mixtures of borazole and di-n-butyl ether could be distilled away from LiAlH₄ and the two volatile components separated from each other by fractionation. Since when this technique was carried out practically no borazole was found in the volatile material, they were led to consider the possibility that the difficulty might be due to the presence of aluminum hydride formed according to the equation:

III   $3LiAlH_4 + B_3N_3H_3Cl_3 \rightarrow B_3N_3H_6 + 3LiCl + 3AlH_3$

This explanation found support in the results of experiments that involved the addition of lithium hydride to the reaction mass in order to convert any aluminum hydride that may have been formed into lithium aluminum hydride. Although this technique on a small scale gave a yield of borazole of about 84% of the theoretical, "experiments on a larger scale were unsuccessful." Schaefer et al. state that the difficulty due to aluminum hydride can be avoided by using lithium borohydride to reduce B-trichloroborazole to borazole. However, this technique then yields gaseous diborane as a by-product which, the authors state, "is a decided disadvantage to a preparative procedure unless one has use for diborane, and has the apparatus necessary for collecting and storing it."

In marked contrast to the teachings of Schaefer et al., supra, with respect to the reduction of B-trichloroborazole to borazole by reaction with LiAlH₄ (see Equation III showing the use of the reactants in the ratio of 3 moles of LiAlH₄ to 1 mole of $B_3N_3H_3Cl_3$), we have surprisingly found that in the case of the reduction of B-trichloro-N-triphenylborazole to N-triphenylborazole with LiAlH₄, the stoichiometrical proportions of reactants are as shown in Equation II, that is, 3 moles of LiAlH₄ to 4 moles of $B_3N_3Cl_3(C_6H_5)_3$, or one-fourth the amount of LiAlH₄ required by Schaefer et al. We have further found that N-triphenylborazole can be isolated from the reaction mass.

In order that those skilled in the art may better understand how the present invention can be carried into effect, the following examples are given by way of illustration and not by way of limitation.

Example 1

A suspension of B,B',B''-trichloro-N,N',N''-triphenylborazole (27.7 g., 0.067 mole) in 150 ml. anhydrous ether is added in small portions over a period of ½ hour to a suspension of lithium aluminum hydride (5.0 g., 0.13 mole) in 200 ml. anhydrous ether. The mixture is stirred for 22 hours at room temperature (20°–30° C.) after the addition has been completed. At the end of this period of time, the reaction mass consists of a gray solid (presumably a mixture of LiCl and AlCl₃) suspended in a colorless ether solution containing the N-triphenylborazole dissolved therein. Saturated aqueous ammonium chloride solution is added dropwise with cooling and rapid stirring to the point at which a gray solid settles rapidly from the clear, colorless, ether solution, which is decanted and filtered through anhydrous sodium sulfate. The ether solution is evaporated to dryness at room temperature and aspirator pressure. The colorless, partly crystalline residue is refluxed with dry n-hexane for 45 minutes, and the small amount of insoluble material present therein is removed by filtration. After concentrating the filtrate to about 100 ml. and cooling, the product separates in 13.3 g. yield (64% of the theoretical) as nicely formed prisms; M.P. 154°–157° C. Two recrystallizations from n-hexane provide an analytical sample; M.P., 158°–160° C.

|  | Percent C | Percent H | Percent N | Percent B |
|---|---|---|---|---|
| Analysis calculated for $C_{18}H_{18}N_3B_3$ | 70.01 | 5.87 | 13.61 | 10.51 |
| Found | 69.77 | 6.07 | 13.43 | 10.29 |

Example 2

In this example the lithium aluminum hydride and B,B',B'' - trichloro - N,N',N'' - triphenylborazole are employed in a molar ratio of 4.4 moles of the former to 4.0 moles of the latter. In other words, the lithium aluminum hydride is used in an amount which is about 46.7 molar percent in excess of stoichiometrical proportions.

A suspension of B,B',B''-trichloro-N,N',N''-triphenylborazole (165 g.; 0.40 mole) in 1.5 liters anhydrous ether is added in small portions over a period of one and one-half hours to a suspension of lithium aluminum hydride (16.7 g.; 0.44 mole) in 2.5 liters anhydrous ether. The remainder of the procedure is essentially the same as that described under Example 1, with the exception that the final filtrate is concentrated to about 250 ml. Upon cooling this filtrate, N,N',N''-triphenylborazole separates in a yield of 103.9 g., which corresponds to 85% of the theoretical.

*Example 3*

Same as in Example 2 with the exception that B,B',B''-tribromo-N,N',N''-triphenylborazole is employed instead of B,B',B''-trichloro-N,N',N''-triphenylborazole. Similar results are obtained.

Instead of B,B',B''-trichloro-N,N',N''-triphenylborazole as a starting reactant, one may use the corresponding tribromo, trifluoro or triiodo derivatives. Instead of using anhydrous ether (diethyl ether) as the inert, liquid solvent or diluent in which the reactants are dispersed or suspended, one may employ any other suitable anhydrous, liquid solvent or diluent that is inert during the reaction, e.g., di-n-propyl ether, di-n-butyl ether and other ethers, dioxane, benzene and other aromatic hydrocarbons, n-hexane, n-heptane, n-octane and other aliphatic hydrocarbons, etc. The reaction between the B,B',B''-trihalogeno-N,N',N''-triphenylborazole and the lithium aluminum hydride in the chosen inert, anhydrous, volatilizable, liquid, reaction medium is effected under anhydrous (substantially completely anhydrous) conditions.

Instead of carrying out the reaction at room temperature as described in the foregoing examples, it may be effected at a temperature of, for example, from about 1° or 2° C. up to the boiling point at atmospheric pressure of the particular liquid reaction medium employed, and more particularly up to, for instance, about 150° C.

Regarding the molar proportions of reactants, it will be noted that in Example 1 the reactants are employed in a molar ratio of about 2 moles of lithium aluminum hydride per mole of B,B',B''-trichloro-N,N',N''-triphenylborazole (B-trichloro-N-triphenylborazole), or, otherwise stated, an amount of $LiAlH_4$ which is about 167 molar percent in excess of the stoichiometrical amount required for the reaction with the B-trichloro-N-triphenylborazole; while in Examples 2 and 3 the amount of $LiAlH_4$ employed is about 46.7 molar percent in excess of the stoichiometrical amount required for the reaction with the B-trihalogeno-N-triphenylborazole. However, molar ratios of reactants other than those set forth by way of illustration in the foregoing examples can be used, and more particularly from 3 to 8 moles of $LiAlH_4$ for each 4 moles of the B-trihalogeno-N-triphenylborazole. The $LiAlH_4$ is preferably employed somewhat in excess (e.g., from about 10 to about 50 molar percent in excess) of the stoichiometrical amount required for reaction with the B-trihalogeno-N-triphenylborazole reactant. As shown by comparing the yields obtained in Examples 1 and 2, higher yields of N-triphenylborazole result when the molar amount of $LiAlH_4$ is decreased but still maintaining it in excess of stoichiometrical proportions. Obviously the minimum amount of $LiAlH_4$ that will give the maximum yield of product at lowest cost is the preferred amount.

At the end of the reaction period, the N-triphenylborazole is isolated from the reaction mass. One suitable method of isolating the desired product, and which we believe to be new and novel, is that employed in the examples. This method involves the slow addition of a saturated aqueous ammonium chloride solution to the reaction mass, and continuing the addition to the point at which the by-product salts of the reaction settle rapidly from the clear solution. Instead of a saturated aqueous solution of ammonium chloride, one may use a saturated aqueous solution of an acidic ammonium salt of any other acid having a pK value of less than 4.75. Additional examples of such salts are ammonium sulfate, ammonium nitrate, ammonium bromide, ammonium chlorate, ammonium perchlorate, ammonium tartrate, ammonium sulfite, ammonium bromoacetate, ammonium alpha-bromopropionate, ammonium dichloroacetate, ammonium formate, ammonium fumarate, ammonium phosphate, ammonium dihydrogen phosphate, ammonium pyrophosphate and ammonium trichloroacetate. Evaporation of the solvent from the supernatant solution, after the latter has been freed of any remaining solids (as by filtration, centrifuging, etc.), yields a residue comprising the crude N,N',N''-triphenylborazole, which then can be purified (if desired) by any of the methods commonly employed in organic synthesis.

The following examples illustrates the utility of the N,N',N''-triphenylborazole, more particularly as a chemical intermediate in making unsymmetrically-substituted borazoles.

*Example 4*

A solution of n-butyl lithium, prepared in the usual way from lithium metal (1.1 g.; 0.16 g. atom) and n-butyl bromide (10.96 g.; 0.08 mole) in 60 ml. ether, is added dropwise over a ½-hour period to a solution of N-triphenylborazole (6.16 g.; 0.02 mole) in 100 ml. ether. The reaction mixture is then allowed to stand for about 16 hours at room temperature (20°–30° C.). After cooling the reaction flask in an ice-water bath, the reaction mass is titrated with a saturated aqueous ammonium chloride solution to the point at which the lithium salts settle rapidly from the stirred solution. The supernatant ether solution is decanted from the insoluble salts which, in turn, are washed with three 25 ml. portions of fresh ether. The combined ether solutions are then concentrated and methanol added to the boiling ether solution until the product begins to separate from solution. After cooling to room temperature and collecting by filtration, there is obtained 5.3 g. of B-tri-n-butyl-N-triphenylborazole of M.P. 127°–129° C.; yield: 56%.

*Example 5*

Methyl magnesium iodide is prepared in the usual way from magnesium (2.1 g.; 0.085 g. atom) and methyl iodide (10.6 g.; 0.075 mole) in 75 ml. of anhydrous diethyl ether and added dropwise over a 45-minute period to a stirred suspension of N-triphenylborazole (6.2 g.; 0.02 mole) in 50 ml. of diethyl ether. The reaction mixture is stirred for one hour after addition of the Grignard reagent and then titrated with a saturated aqueous solution of ammonium chloride to the point at which the magnesium salts settle rapidly from the stirred solution. Anhydrous magnesium sulfate (2 g.) is added to the reaction mass, which is then allowed to stand at room temperature (20°–30° C.) for about 16 hours, after which it is diluted with ether and filtered from the insoluble salts. The collected precipitate is washed with three 50 ml.-portions of fresh ether and the washings are added to the filtrate. Concentration of the combined ether solution and washings gives two crops of crystals; M.P. 269°–272° C. Weight: 5.4 g.; 77% yield. They are identical to authentic B-trimethyl-N-triphenylborazole prepared from B-trichloro-N-triphenylborazole and methyl magnesium iodide.

The products of Examples 4 and 5 are useful as additives to motor fuels for preventing an increase in octane requirement; as additives, for imparting anti-wear properties, to various industrial oils including diesel lubricating oils, automotive lubricating oils, cutting oils, drawing oils, gear oils, etc. They can be used as additives to both petroleum hydrocarbon lubricating oils and synthetic lubricating oils, among which latter may be mentioned polymers of alkylene glycols and alkylene oxides, organic esters (e.g., 2-ethylhexyl sebacate), and others now well known in the art.

In a manner similar to that described hereinbefore with particular reference to the production of N,N′,N″-triphenylborazole, one can prepare other N,N′,N″-tri-(aromatic-substituted)borazoles, and which may be represented by the general formula IX
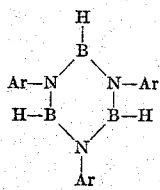

wherein Ar represents an aromatic (including aliphatic-substituted aromatic) hydrocarbon radical. Illustrative examples of aromatic hydrocarbon radicals represented by Ar in the above formula are phenyl, biphenylyl or xenyl, naphthyl, arthryl, naphthyl-substituted anthryl and dianthryl, tolyl, ethylphenyl, propylphenyl, isopropylphenyl, butylphenyl, vinylphenyl, allylphenyl, propenylphenyl, isopropenylphenyl, crotylphenyl, etc.

We claim:

1. The method of preparing N,N′,N″-triphenylborazole which comprises effecting reaction between lithium aluminum hydride and a B,B′,B″-trihalogeno-N,N′,N″-triphenylborazole in the ratio of from 3 to 8 moles of the former for each 4 moles of the latter, said reaction being effected while the said reactants are contained in an inert, anhydrous, volatilizable, liquid, reaction medium at a temperature ranging from about 1° C. up to the boiling point at atmospheric pressure of the said reaction medium; and isolating N,N′,N″-triphenylborazole from the resulting reaction mass by first precipitating the solid matter suspended therein by adding to said mass a saturated aqueous solution of an acidic ammonium salt of an acid having a pK value of less than 4.75, separating the precipitated solids, and recovering N,N′,N″-triphenylborazole from the resulting liquid medium containing the same in dissolved state by at least partly evaporating the said liquid medium.

2. A method as in claim 1 wherein the B,B′,B″-trihalogeno-N,N′,N″-triphenylborazole is B,B′,B″-trichloro-N,N′,N″-triphenylborazole.

3. A method as in claim 1 wherein the saturated aqueous solution of the acidic ammonium salt is a saturated aqueous solution of ammonium chloride.

4. A method as in claim 1 wherein the amount of lithium aluminum hydride is from about 10 to about 50 molar percent in excess of the stoichiometrical amount required for reaction with the B,B′,B″-trihalogeno-N,N′,N″-triphenylborazole reactant.

References Cited in the file of this patent
UNITED STATES PATENTS 2,821,463     Scott et al. _____ Jan. 28, 1958

OTHER REFERENCES

Schechter et al.: Reference Book on Boron Hydrides and Related Compounds, pp. 98–99 and 105 (published March 1951).

Wiberg et al.: Zeitschrift für Anorganische und Allgemeine Chemie, vol. 257, p. 139 (1948).

Chemical and Engineering News (publication), Sept. 16, 1957, page 67.

Groszos et al.: Journal of the American Chemical Society, vol. 80, p. 1358, March 1958.

Hohnstedt et al.: Abstracts of Papers—American Chemical Society, 132nd Meeting, p. 8-S (1957).

Zhigach et al.: Upshekhi Khimii, vol. 25, No. 10, p. 1279 (1956).

Schaeffer et al.: Journal of the American Chemical Society, vol. 76, p. 3304 (1954).

UNITED STATES PATENT OFFICE

CERTIFICATE OF CORRECTION

Patent No. 2,945,882                                              July 19, 1960

Stanley F. Stafiej et al.

It is hereby certified that error appears in the printed specification of the above numbered patent requiring correction and that the said Letters Patent should read as corrected below.

Column 1, line 18, at the left-hand side of the formula insert -- I --; column 4, line 16, for "illustrates" read -- illustrate --; column 5, line 6, for "IX" read -- IV --; line 18, for "arthryl" read -- anthryl --.

Signed and sealed this 20th day of December 1960.

(SEAL)
Attest:

KARL H. AXLINE
Attesting Officer

ROBERT C. WATSON
Commissioner of Patents